United States Patent
Togawa

(10) Patent No.: US 12,158,834 B2
(45) Date of Patent: Dec. 3, 2024

(54) LOG ANALYSIS DEVICE, LOG ANALYSIS METHOD, AND PROGRAM

(71) Applicant: NEC Corporation, Tokyo (JP)

(72) Inventor: Ryosuke Togawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 970 days.

(21) Appl. No.: 17/260,654

(22) PCT Filed: Jul. 20, 2018

(86) PCT No.: PCT/JP2018/027335
§ 371 (c)(1),
(2) Date: Jan. 15, 2021

(87) PCT Pub. No.: WO2020/017037
PCT Pub. Date: Jan. 23, 2020

(65) Prior Publication Data
US 2022/0004481 A1    Jan. 6, 2022

(51) Int. Cl.
*G06F 11/34* (2006.01)
*G06F 17/40* (2006.01)

(52) U.S. Cl.
CPC ...... *G06F 11/3476* (2013.01); *G06F 11/3438* (2013.01); *G06F 17/40* (2013.01)

(58) Field of Classification Search
CPC .. G06F 11/3476; G06F 11/3438; G06F 17/40; G06F 18/00
See application file for complete search history.

(56) References Cited

U.S. PATENT DOCUMENTS

| | | | | |
|---|---|---|---|---|
| 10,268,750 | B2 * | 4/2019 | Zhao | G06F 11/3452 707/769 |
| 11,249,880 | B1 * | 2/2022 | Li | G06F 11/3636 707/769 |
| 2006/0195297 | A1 * | 8/2006 | Kubota | G06F 16/95 707/E17.107 |
| 2012/0101802 | A1 * | 4/2012 | Nonoyama | G06F 11/3476 703/22 |
| 2012/0124047 | A1 * | 5/2012 | Hubbard | G06F 16/332 707/769 |
| 2016/0063388 | A1 | 3/2016 | Mizutani | |
| 2016/0224402 | A1 * | 8/2016 | Togawa | G06F 11/079 707/769 |

(Continued)

FOREIGN PATENT DOCUMENTS

| | | |
|---|---|---|
| JP | 2001-356939 A | 12/2001 |
| JP | 2005-209115 A | 8/2005 |

(Continued)

OTHER PUBLICATIONS

International Search Report for PCT Application No. PCT/JP2018/027335, mailed on Oct. 23, 2018.

*Primary Examiner* — Yuk Ting Choi
(74) *Attorney, Agent, or Firm* — Sughrue Mion, PLLC

(57) ABSTRACT

A generation unit that generates a new abstraction log based on the distribution of log values corresponding to a variable in an abstraction log is included. The abstraction log includes at least one or more variables. The variable includes at least one or more log values. The new abstraction log is obtained by replacing the variable in the abstraction log with the log value.

11 Claims, 10 Drawing Sheets

| ts1 | { 2017/02/24 09:01:00 , 2017/02/24 09:02:00 , ⋯ } : { 1 , 1 , ⋯ } |
|---|---|
| P1W1 | { login , logout , ⋯ } : { 3 , 4 , ⋯ } |
| P1IP1 | { 127.0.0.1 , ⋯ } : { 2 , ⋯ } |
| P1W2 | { bear , fox , ⋯ } : { 2 , 7 , ⋯ } |
| P2W1 | { login , logout , ⋯ } : { 2 , 2 , ⋯ } |
| P2IP1 | { 192.10.0.5 , 192.10.0.6 , ⋯ } : { 2 , 2 , ⋯ } |
| P2NS1 | { bear123 , bear_1 , ⋯ } : { 2 , 2 , ⋯ } |

(56) References Cited

U.S. PATENT DOCUMENTS

| | | | | |
|---|---|---|---|---|
| 2016/0364470 A1* | 12/2016 | Seiver | ................. | G06F 16/22 |
| | | | | 707/769 |
| 2018/0253434 A1* | 9/2018 | Johnson | ............. | G06F 16/214 |
| | | | | 707/769 |
| 2019/0228085 A1* | 7/2019 | Biswas | ............. | G06F 16/152 |
| | | | | 707/769 |
| 2019/0243827 A1* | 8/2019 | Ferrar | ................. | G06N 20/00 |
| | | | | 707/769 |
| 2020/0019484 A1* | 1/2020 | Kolesnik | ............ | G06F 40/211 |
| | | | | 707/737 |

FOREIGN PATENT DOCUMENTS

| | | |
|---|---|---|
| JP | 2010-218333 A | 9/2010 |
| JP | 2013-171471 A | 9/2013 |
| JP | 5988447 B2 | 9/2016 |
| WO | 2017/085921 A1 | 5/2017 |

\* cited by examiner 1.  2017/02/24  09:01:00  login    127.0.0.1   bear
2.  2017/02/24  09:02:00  logout  127.0.0.1   bear
3.  2017/02/24  09:03:00  login    192.10.0.5  bear123
4.  2017/02/24  09:04:00  logout  192.10.0.5  bear123
5.  2017/02/24  09:04:10  login    192.10.0.6  bear_1
6.  2017/02/24  09:04:40  logout  192.10.0.6  bear_1
7.  2017/02/24  09:05:00  DB Access   127.0.0.1
8.  2017/02/24  09:06:00  DB Access   127.10.0.1

1. % {NUM_TS_1:ts1} % {WORD:P1W1} % {IP_NUM:P1IP1} % {WORD:P1W2}
   CORRESPONDING LOG : 1,2

2. % {NUM_TS_1:ts1} % {WORD:P2W1} % {IP_NUM:P2IP1} % {NOTSPACE:P2NS1}
   CORRESPONDING LOG : 3,4,5,6

3. % {NUM_TS_1:ts1} % {WORD:P3W1} % {WORD:P3W2} % {IP_NUM:P3IP1}
   CORRESPONDING LOG : 7,8

| ts1   | { 2017/02/24 09:01:00 , 2017/02/24 09:02:00 , ··· } : { 1 , 1 , ··· } |
|-------|------------------------------------------------------------------------|
| P1W1  | { login , logout , ··· } : { 3 , 4 , ··· }                             |
| P1IP1 | { 127.0.0.1 , ··· } : { 2 , ··· }                                      |
| P1W2  | { bear , fox , ··· } : { 2 , 7 , ··· }                                 |
| P2W1  | { login , logout , ··· } : { 2 , 2 , ··· }                             |
| P2IP1 | { 192.10.0.5 , 192.10.0.6 , ··· } : { 2 , 2 , ··· }                    |
| P2NS1 | { bear123 , bear_1 , ··· } : { 2 , 2 , ··· }                           |
| ⋮     | ⋮                                                                      |

1. % {NUM_TS_1:ts1} % {WORD:P1W1} % {IP_NUM:P1IP1} % {WORD:P1W2}

1a. % {NUM_TS_1:ts1} login% {IP_NUM:P1IP1} % {WORD:P1W2}

1a. % {NUM_TS_1:ts1} logout% {IP_NUM:P1IP1} % {WORD:P1W2}

1a. % {NUMTS_1:ts1} % {WORD:P1W1} % {IP_NUM:P1IP1} % {WORD:P1W2}

LOG ANALYSIS DEVICE, LOG ANALYSIS METHOD, AND PROGRAM

This application is a National Stage Entry of PCT/JP2018/027335 filed on Jul. 20, 2018, the contents of all of which are incorporated herein by reference, in their entirety.

TECHNICAL FIELD

The present invention relates to a log analysis device, a log analysis method, and a program.

BACKGROUND ART

A technique for monitoring log messages such as system logs and application logs is known.

For example, Patent Document 1 describes an example of a method for estimating the format of a log message. According to Patent Document 1, by setting the respective parts of a first log message divided before or after a predetermined character such as a symbol or a blank as nodes, and arranging the nodes in order from the beginning of the first log message, a first directed graph structure is created. Also, by setting the respective parts of a second log message divided before or after the predetermined character as nodes, and arranging the nodes from the beginning of the second log message, a second directed graph structure is created. Then, by comparing the nodes in the first directed graph structure with the nodes in the second directed graph structure, nodes other than nodes having the same character strings are detected. Moreover, among the detected nodes, a detected node in the second directed graph structure is added to the first directed graph structure as a first branch node, and a format is estimated based on the first directed graph structure with the first branch node added. At this time, update of the directed graph is performed based on whether or not the appearance tendency of character strings is similar.

Further, a related technique is described in, for example, Patent Document 2. According to Patent Document 2, a log information analysis device creates a general-purpose log including a time converted into a predetermined time format and a predetermined character string converted into a predetermined format from log information. Then, the log information analysis device extracts characteristic information including the length of the log information corresponding to the general-purpose log and the appearance frequency of words appearing in the log information from a log information recording unit in which the log information is recorded, and also graphically represents the extracted log information to display together with the log information in order of the time converted into the predetermined time format.

Further, a related technique is described in, for example, Patent Document 3. According to Patent Document 3, a monitoring information analysis device generates a template by performing clustering based on a score calculated on each word included in a log message.

Patent Document 1: Japanese Patent No. JP 5988447
Patent Document 2: Japanese Unexamined Patent Application Publication No. JP-A 2001-356939
Patent Document 3: Japanese Unexamined Patent Application Publication No. JP-A 2013-171471

In the case of the technique described in Patent Document 1, whether the appearance tendency of a character string is similar or not is determined based on the type of characters forming the character string, the length of the character string, and so on. With such a configuration, for example, character strings that can be optionally defined by the user such as a user name, a server name, and a file name are determined to be character strings having different appearance tendencies and cannot be handled uniquely. That is to say, in the case of the technique described in Patent Document 1, there is a problem that an optional character string and the like cannot be determined as a similar format (pattern).

In general, when the level of abstraction of a format (pattern) is high (when the ratio of variables is high), a large number of log candidates corresponding to the format arise, and a log desired by the user gets buried. As a result, it becomes difficult to analyze logs with accuracy. On the other hand, when the level of abstraction of a format (pattern) is low, many patterns are required to extract a log desired by the user. However, it is inefficient to perform analysis multiple times using many patterns. From the above, it is desirable to appropriately set the level of abstraction of a format in order to analyze logs with accuracy and efficiency. However, as stated above, in the case of Patent Document 1, it is impossible to determine an optional character string and the like as a similar format (pattern). As a result, it becomes difficult to appropriately set the level of abstraction, and it may be difficult to analyze logs with efficiency and accuracy.

Further, any method for solving such a problem is not described in Patent Document 2 or Patent Document 3. Therefore, even if the techniques described in Patent Documents 2 and 3 are used, the abovementioned problem cannot be solved.

SUMMARY

Accordingly, an object of the present invention is to provide a log analysis device, a log analysis method and a program for analyzing logs efficiently and accurately.

In order to achieve the object, a log analysis device according to an aspect of the present invention includes a generation unit configured to generate a new abstraction log based on a distribution of log values corresponding to a variable in an abstraction log. The abstraction log includes at least one or more variables. The variable includes at least one or more log values. The new abstraction log is obtained by replacing the variable in the abstraction log with the log value.

Further, a log analysis method according to another aspect of the present invention is a log analysis method executed by an information processing device. The log analysis method includes generating a new abstraction log based on a distribution of log values corresponding to a variable in an abstraction log. The abstraction log includes at least one or more variables. The variable includes at least one or more log values. The new abstraction log is obtained by replacing the variable in the abstraction log with the log value.

Further, a program according to another aspect of the present invention is a computer program including instructions for causing an information processing device to realize a log analysis device comprising a generation unit configured to generate a new abstraction log based on a distribution of log values corresponding to a variable in an abstraction log, the abstraction log including at least one or more variables, the variable including at least one or more log values, the new abstraction log being obtained by replacing the variable in the abstraction log with the log value.

With the configurations as described above, the present invention can provide a log analysis device, a log analysis method and a program for analyzing logs efficiently and accurately.

BRIEF DESCRIPTION OF DRAWINGS

FIG. 3 is a view showing an example of a pattern generated by performing value-to-variable conversion on the log message;

FIG. 4 is a view showing an example of a state when a log value is extracted for each field;

EXAMPLE EMBODIMENTS

First Example Embodiment

Figure 1:
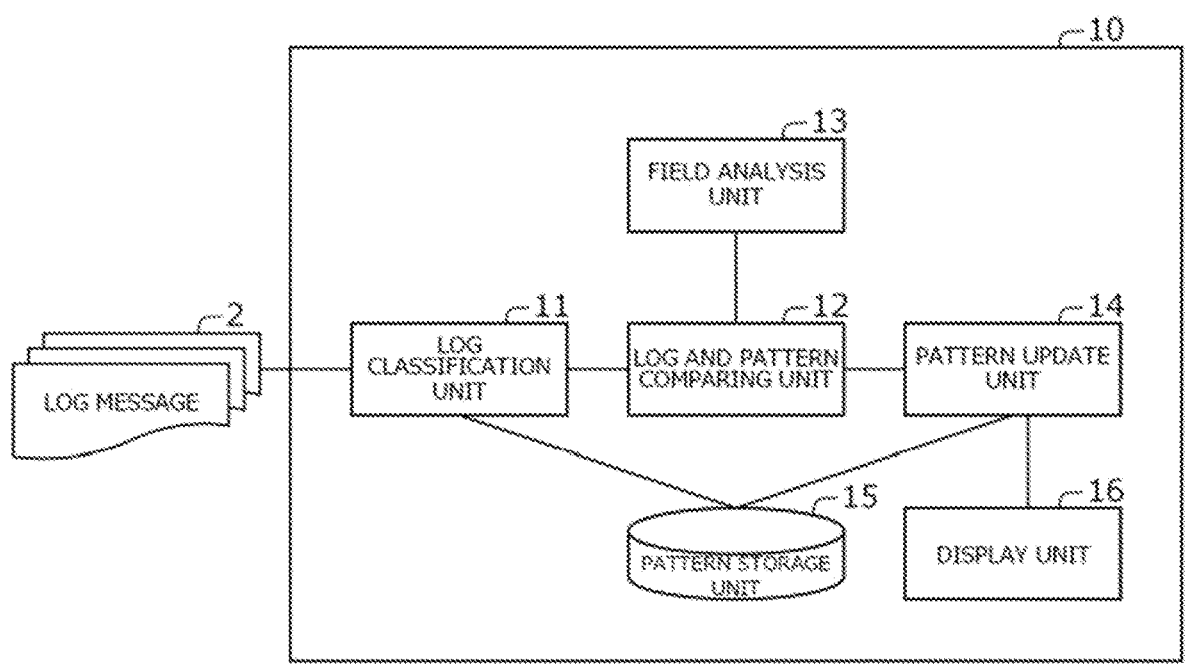
FIG. 1 is a block diagram showing an example of a configuration of a log analysis device in a first example embodiment of the present invention.
Figure 2:
FIG. 2 is a view showing an example of a log message inputted into the log analysis device.
Figure 5:
FIG. 5 is a view showing an example of a state when the variable of a field is replaced with a value and a new pattern is generated in accordance with the result of analysis.
Figure 6:
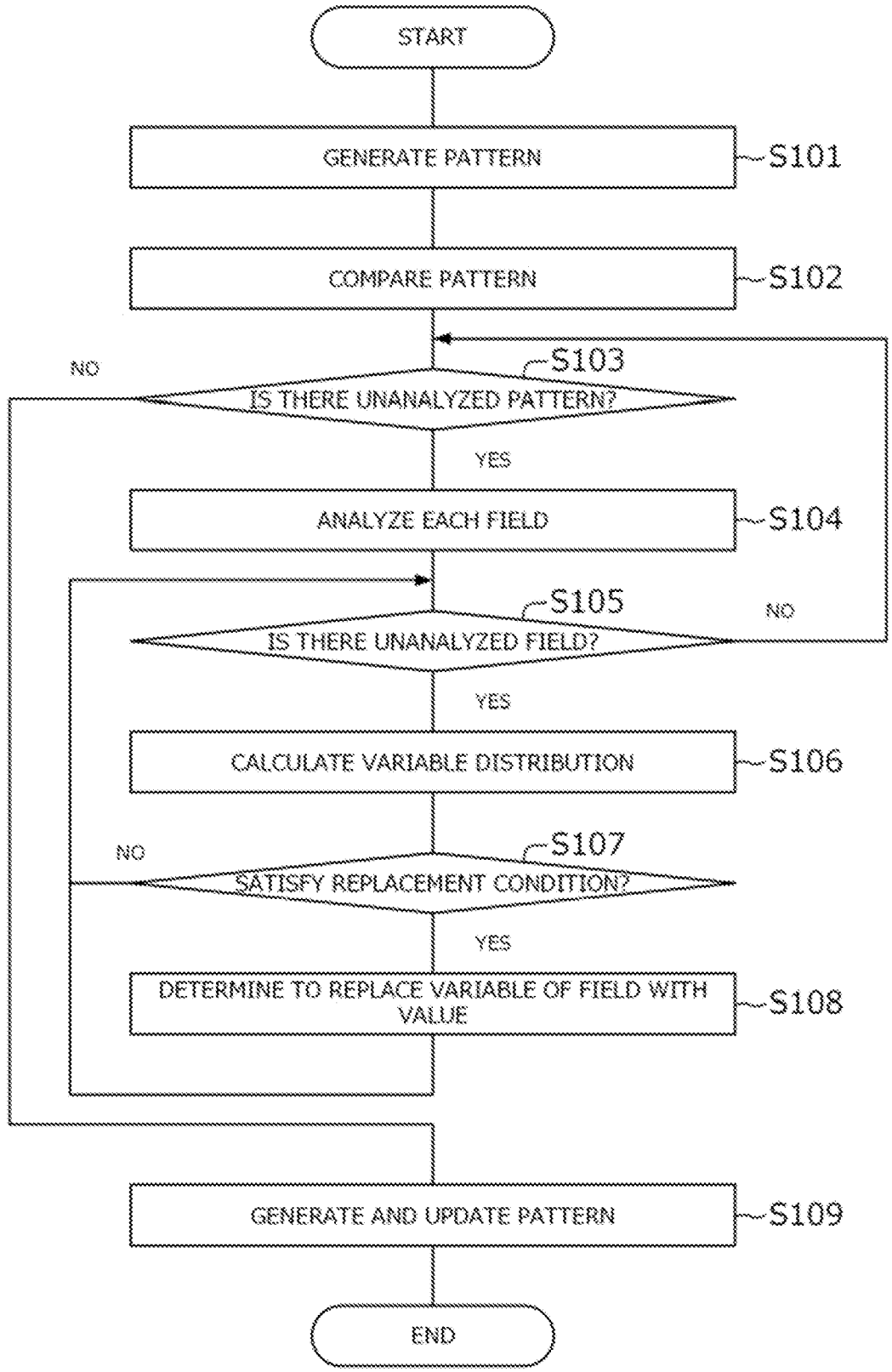
FIG. 6 is a flowchart showing an example of an operation of the log monitoring device in the first example embodiment of the present invention.

A first example embodiment of the present invention will be described with reference to FIGS. 1 to 6. FIG. 1 is a block diagram showing an example of a configuration of a log analysis device 10. FIG. 2 is a view showing an example of a log message 2 inputted into the log analysis device 10. FIG. 3 is a view showing an example of a pattern generated by performing value-to-variable conversion on the log message 2. FIG. 4 is a view showing an example of a state when a log value is extracted for each field. FIG. 5 is a view showing an example of a state when a new pattern is generated by replacing the variable of a field with a value in accordance with the result of analysis. FIG. 6 is a flowchart showing an example of an operation of the log monitoring device 10.

In the first example embodiment of the present invention, the log analysis device 10 that generates a pattern (abstraction log) by performing value-to-variable conversion and aggregation on a plurality of logs in the log message 2 for each predetermined field will be described. As will be described later, the log analysis device 10 of this example embodiment compares a generated pattern with the log message 2 corresponding to the pattern for each field, and calculates the distribution of values included by the variables in the pattern. Then, the log analysis device 10 replaces at least part of the variables with values based on the calculated result. With this, the log analysis device 10 generates, based on a single pattern, a plurality of patterns in which at least part of the variables in the pattern is replaced with a value.

In this example embodiment, a pattern refers to a log represented by using variables. Value-to-variable conversion refers to converting the values of fields in a log into variables. As will be described later, the log analysis device 10 generates a pattern by performing value-to-variable conversion and aggregation on a plurality of logs having the same sequences of variables when the values of the respective fields in the logs are converted into variables. A field refers to a range that serves as a reference for determining a value in a log and a variable. For example, a log is divided into fields at places where the content (attribute) of target/information indicated by the log changes, such as date and time, IP address (Internet Protocol address), alphabets only, alphanumeric mixture, and numbers only. Fields may be separated at places other than those illustrated above; for example, different fields for date and time. That is to say, fields may be separated at any places. Moreover, variables corresponding to the attributes of fields are, for example, alphabets only (WORD), alphanumeric mixture (NOTSPACE), and numbers only (NUM). Variables may be those obtained by subdividing the abovementioned variables or those other than illustrated above: for example, a variable of only numbers indicating date and time, and a variable indicating IP address.

For example, a log "2017 Feb. 24 09:01:00 login 127.0.0.1 bear" and a log "2017 Feb. 24 09:02:00 logout 127.0.0.1 bear" have the same sequences of variables when the values of the respective fields are converted into variables, "field date and time, field of alphabets only, field of IP address, and field of alphabets only. Then, the log analysis device 10 performs value-to-variable conversion and aggregation on the two longs, thereby generating a single pattern from the two logs. To be specific, for example, the log analysis device 10 generates a pattern such as "% {NUM_TS} % {WORD} % {IP_NUM} % {WORD}". In the case illustrated above, a value "2017 Feb. 24 09:01:00" and a value "2017 Feb. 24 09:02:00" correspond to a variable "% {NUM_TS}". A value "login" and a value "logout" correspond to a first variable "% {WORD}". A value "127.0.0.1" corresponds to a variable "% {IP_NUM}", and a value "bear" corresponds to a second variable "% {WORD}".

The log analysis device 10 is an information processing device that, when receiving the log message 2 from an external device or the like, generates a pattern by performing value-to-variable conversion on the respective logs contained in the log message 2 for each predetermined field. FIG. 1 shows an example of a configuration of the log analysis device 10. Referring to FIG. 1, the log analysis device 10 includes, for example, a log classification unit 11, a log and pattern comparing unit 12 (analysis unit), a field analysis unit 13 (analysis unit), a pattern update unit 14 (generation unit), a pattern storage unit 15, and a display unit 16.

For example, the log analysis device 10 includes an arithmetic logic unit such as a CPU (Central Processing Unit) and a storage unit. The log analysis device 10 realizes the abovementioned processing units by the arithmetic log unit executing a program stored in the storage unit, for example.

The log classification unit 11 generates a pattern based on the log message 2 by performing value-to-variable conversion and aggregation on a plurality of logs having the same sequences of variables when the values of the respective fields in the logs are converted into variables.

For example, it is assumed that the log classification unit 11 receives the log message 2 as shown in FIG. 2. Referring to FIG. 2, the log message 2 contains logs, for example, "2017 Feb. 24 09:01:00 login 127.0.0.1 bear", "2017 Feb. 24 09:02:00 logout 127.0.0.1 bear", "2017 Feb. 24 09:03:00 login 192.10.0.5 bear123", "2017 Feb. 24 09:04:00 logout 192.10.0.5 bear123", "2017 Feb. 24 09:04:10 login 192.10.0.6 bear_1", and so on.

In the case of the log message 2 containing the logs as illustrated above, in the log message 2, the log "2017 Feb. 24 09:01:00 login 127.0.0.1 bear" and the log "2017 Feb. 24 09:02:00 logout 127.0.0.1 bear" have the same sequences of variables "% {NUM_TS} % {WORD} % {IP_NUM} % {WORD}". Moreover, the log "2017 Feb. 24 09:03:00 login 192.10.0.5 bear123", the log "2017 Feb. 24 09:04:00 logout 192.10.0.5 bear123", and the log "2017 Feb. 24 09:04:10 login 192.10.0.6 bear_1" have the same sequences of variables "% {NUM_TS} % {WORD} % {IP_NUM} % {NOTSPACE}". Then, the log classification unit 11 performs value-to-variable conversion and aggregation on the log "2017 Feb. 24 09:01:00 login 127.0.0.1 bear" and the "2017 Feb. 24 09:02:00 logout 127.0.0.1 bear", and thereby generates "% {NUM_TS_1: ts1} % {WORD: P1W1} % {IP_NUM: P1IP1} % {WORD: P1W2}" (see FIG. 3). Moreover, the log classification unit 11 performs value-to-variable conversion and aggregation on the log "2017 Feb. 24 09:03:00 login 192.10.0.5 bear123", the log "2017 Feb. 24 09:04:00 logout 192.10.0.5 bear123", and the log "2017 Feb. 24 09:04:10 login 192.10.0.6 bear_1", and thereby generates "% {NUM_TS_1: ts1} % {WORD: P2W1} % {IP_NUM: P2IP1} % {NOTSPACE: P2NS1}".

The log classification unit 11 may use a method other than the method illustrated above when generating a pattern based on the log message 2. For example, the log classification unit 11 may generate a pattern by dividing the logs contained in the log message 2 into a plurality of subsets by using cluster analysis or the like and performing value-to-variable conversion and aggregation on each of the subsets obtained by division. The log classification unit 11 may generate a pattern by using a known method instead.

Further, in the example described above, the log classification unit 11 performs value-to-variable conversion on all the fields. However, the log classification unit 11 may not necessarily perform value-to-variable conversion on all the fields. In other words, the log classification unit 11 may not perform value-to-variable conversion on part of the values included in a log. That is to say, a pattern generated by the log classification unit 11 may depend on a method of extracting the pattern and include a fixed column (value) that is not converted into a variable.

The log and pattern comparing unit 12 compares a pattern generated by the log classification unit 11 with the logs of the generation source of the pattern for each field. Then, the log and pattern comparing unit 12 counts values corresponding to a variable for each field.

FIG. 4 shows an example of a comparing and counting process by the log and pattern comparing unit 12. Referring to FIG. 4, for example, a variable "% {NUM_TS_1: ts1}" includes one value "2017 Feb. 24 09:01:00" and one value "2017 Feb. 24 09:02:00". Moreover, referring to FIG. 4, for example, a variable "% {WORD: P1W1}" includes three values "login" and four values "logout".

Thus, the log and pattern comparing unit 12 compares a pattern with logs of the generation source of the pattern for each field, and thereby counts values included in a variable.

Meanwhile, for example, in a case where the log classification unit 11 generates a pattern by performing value-to-variable conversion and aggregation for each of the subsets obtained by division by the log classification unit 11, the log and pattern comparing unit 12 can count values for each subset.

The field analysis unit 13 performs a predetermined distribution calculation for each field based on the result of counting by the log and pattern comparing unit 12. With this, the field analysis unit 13 calculates the distribution of log values corresponding to each variable in a pattern. Moreover, the field analysis unit 13 determines whether or not the result of the distribution calculation satisfies a given condition. Then, the field analysis unit 13 determines whether or not to replace the variable of the field with a value based on the result of the determination. As will be described later, in a case where the field analysis unit 13 determines to replace the variable with a value, the pattern update unit 14 replaces the variable of the field determined to replace with the value. In other words, the pattern update unit 14 generates a plurality of patterns according to the number of values after replacement based on a single pattern.

To be specific, for example, the field analysis unit 13 can determine whether or not to replace a variable of a field with a value based on the number of unique values (that is, the number of types of the values) included in a field. For example, the field analysis unit 13 calculates the number of unique values included in a field. Then, in a case where the number of the unique values is equal to or less than a predetermined first threshold value, the field analysis unit 13 determines to replace the variable of the field with a value.

For example, it is assumed that the variable of a first field of a first pattern includes four types of values "SV01, SV02, SV03, SV04". Moreover, it is assumed that a predetermined first threshold value is "10". In this case, because the number of unique values (the number of types of values) included in the field is "4", which is equal to or less than the first threshold value "10", the field analysis unit 13 determines to replace the variable of the field with a value. Thus, the field analysis unit 13 can determine whether or not to replace the variable of a field with a value based on the number of unique values (the number of types of values) included in the field.

Further, for example, the field analysis unit 13 can determine whether or not to replace the variable of a field with a value based on the degree of randomness of the field. For example, the field analysis unit 13 divides the number of unique values included in a field by the number of logs following a pattern (the number of logs aggregated when the pattern is generated). That is to say, the field analysis unit 13 calculates a field randomness degree defined as the ratio of the number of types of values to the number of logs corresponding to any pattern including the field. Then, if the result of the division is equal to or less than a predetermined second threshold value, the field analysis unit 13 determines to replace the variable of the field with a value. Because calculated in the above manner, the field randomness degree has a range of 0 to 1, and the degree of randomness is higher as it is closer to 1.

For example, it is assumed that a second pattern is generated by aggregating ten logs and a second field of the second pattern includes three kinds of values. Moreover, it is assumed that a predetermined second threshold value is "0.5". In this case, because the degree of randomness of the second field is "0.3", which is equal to or less than the second threshold value "0.5", the field analysis unit 13 determines to replace the variable of the field with a value.

Thus, the field analysis unit 13 can determine whether or not to replace the variable of a field with a value based on a field randomness degree.

Further, for example, the field analysis unit 13 can determine whether or not to replace the variable of a field with a value based on a chi-squared value. For example, the field analysis unit 13 calculates a chi-squared value by calculating the sum of (observed value-theoretical value)^2/expected value. In a case where the result of the calculation is equal to or more than a predetermined third threshold value, the field analysis unit 13 determines to replace the variable of the field with a value. An observed value is the number of values in a field, and a theoretical value is a value obtained by dividing the number of corresponding logs by the number of types of values.

For example, it is assumed that there are 100 logs corresponding to a third pattern, a third field includes four kinds of values "START, STOP, RESTART, END", and the number of the included values are "40, 10, 40, 10". Moreover, it is assumed that a predetermined third threshold value is "30". In this case, a theoretical value is 25, which is obtained by dividing 100 by 4. Therefore, the chi-squared value is $(40-25)^2/25+(10-25)^2/25+(40-25)^2/25+(10-25)^2/25=36$. In this case, because the chi-squared value of the third field is equal to or more than the third threshold value, the field analysis unit 13 determines to replace the variable of the field with a value. Thus, the field analysis unit 13 can determine whether or not to replace the variable of a field with a value based on a chi-squared value.

Further, for example, the field analysis unit 13 can determine whether or not to replace the variable of a field with a value based on the coefficient of variation. For example, the field analysis unit 13 calculates the coefficient of variation by dividing the standard deviation by the average value. Then, in a case where the calculated coefficient of variation is equal to or more than a fourth threshold value determined in advance, the field analysis unit 13 determines to replace the variable of the field with a value.

For example, it is assumed that there is a field with standard deviation of 40 and average value of 100. Moreover, it is assumed that the fourth threshold value is 0.3. In this case, the coefficient of variation is 40/100, which is 0.4. Because the coefficient of variation of the field is equal to or more than the fourth threshold value, the field analysis unit 13 determines to replace the variable of the field with a value. Thus, the field analysis unit 13 can determine whether or not to replace the variable of a field with a value based on the standard deviation.

Further, for example, the field analysis unit 13 can determine whether or not to replace the variable of a field with a value based on the average value. For example, the field analysis unit 13 calculates the average value from the number of values in a field and the number of types of the values. Then, in a case where the calculated average value is equal to or less than a fifth threshold value determined in advance, the field analysis unit 13 determines to replace the variable of the field with a determined target.

For example, it is assumed that the average value is 100 and the fifth threshold value is 200. In this case, since the average value is equal to or less than the fifth threshold value, the field analysis unit 13 determines to replace the variable of the field with a value. Thus, the field analysis unit 13 can determine whether or not to replace the variable of a field with a value based on the average value.

Further, for example, the field analysis unit 13 can determine whether or not to replace the variable of a field with a value based on an expected value. For example, the field analysis unit 13 calculates an expected value based on the number of corresponding logs and the number of types of values. Then, the field analysis unit 13 determines to target a value of a number more than the calculated expected value for replacement and replace the variable of the field with a value.

For example, it is assumed that the number of corresponding logs is 100 and the number of types of values is 5. In this case, an expected value is 20 from 40/100. Then, the field analysis unit 13 targets a value of a number equal to or more than 20 for replacement. On the other hand, the field analysis unit 13 does not target a value of a number less than 20 for replacement. Thus, the field analysis unit 13 can determine whether or not to replace the variable of a field with a value based on an expected value.

As described above, the field analysis unit 13 can determine whether or not to replace the variable of a field with a value based on the results of various distribution calculations. The field analysis unit 13 may be configured to determine whether or not to replace the variable of a field with a value using any one of the methods described above, or may be configured to determine whether or not to replace the variable of a field with a value by combining the methods described above. In the case of determining whether or not to replace by combining the methods, the field analysis unit 13 may be configured to determine to replace if even one of the conditions is satisfied, or may be configured to determine to replace if some of the conditions, for example, half or more of the conditions are satisfied, or may be configured to determine to replace if all the conditions are satisfied. The field analysis unit 13 may be configured to determine whether or not to replace the variable of a field with a value using a method other than the methods described above.

Further, the field analysis unit 13 may be configured to determine to replace in the opposite case to the illustrated case, for example, in a case where a chi-squared value is less than the third threshold value. The determination by the field analysis unit 13 may be changed based on attribute information such as the data type of a field.

Further, by using the method as described above, the field analysis unit 13 may determine to completely replace the variable with values (do not leave the variable), or may determine to leave the variable. In other words, the field analysis unit 13 may determine to replace the variable of a field with part of values corresponding to the variable and leave the variable. For example, it is assumed that a variable "% {WORD}" includes four values "AAAA", "BBBB", "CCCC", and "DDDD". In this case, the field analysis unit 13 may be configured to completely replace the variable "% {WORD}" with the four values "AAAA", "BBBB", "CCCC" and "DDDD", or may be configured to replace with only part of the values, for example, replace with only two values "AAAA" and "BBBB" and leave the variable "% {WORD}. In a case where the field analysis unit 13 determines to leave the variable of the field, a value corresponding to the variable after replacement is the residual after excluding the replaced values from the values originally included in the variable. For example, in the case of the above variable "% {WORD}", the variable "% {WORD}" after replacement includes the value "CCCC" and the value "DDDD".

The pattern update unit 14 replaces the variable of a field determined to replace by the field analysis unit 13 with a value based on the results of comparison by the log and pattern comparing unit 12 and determination by the field analysis unit 13. With this, the pattern update unit 14 generates a plurality of patterns based on a single pattern. The pattern update unit 14 also updates the pattern storage unit 15.

For example, as shown in FIG. 5, the pattern update unit 14 replaces a variable "% {WORD: P1W1}" in a pattern "% {NUM_TS_1: ts1} % {WORD: P1W1} % {IP_NUM: P1IP1} % {WORD: P1W2}" with the value "login" or the value "logout", and also leaves the variable "% {WORD: P1W1}". That is to say, the pattern update unit 14 generates a pattern "% {NUM_TS_1: ts1} login % {IP_NUM: P1IP1} % {WORD: P1W2}" and a pattern "% {NUM_TS_1: ts1} logout % {IP_NUM: P1IP1} % {WORD: P1W2}" based on the pattern "% {NUM_TS_1: ts1} % {WORD: P1W1} % {IP_NUM: P1IP1} % {WORD: P1W2}", and also leaves the pattern "% {NUM_TS_1: ts1} % {WORD: P1W1} % {IP_NUM: P1IP1} % {WORD: P1W2}". In this manner, the pattern update unit 14 generates a pattern by replacing a variable with a value. After that, the pattern update unit 14 updates the pattern "% {NUM_TS_1: ts1} % {WORD: P1W1} % {IP_NUM: P1IP1} % {WORD: P1W2}" stored in the pattern storage unit 15 into the above three patterns.

In the above manner, the pattern update unit 14 replaces the variable of a field determined to replace by the field analysis unit 13 with a value, and also performs update of the pattern storage unit 15.

The pattern storage unit 15 is a storage unit such as a hard disk and a memory. In the pattern storage unit 15, as described above, a pattern generated by performing value-to-variable conversion and aggregation on the logs in the log message 2 by the log classification unit 11 is stored. Moreover, the pattern stored in the pattern storage unit 15 is updated by the pattern update unit 14.

In the pattern storage unit 15, the log message 2 may be stored together with a pattern. For example, the log classification unit 11 can be configured to store a pattern in the pattern storage unit 15 and also store the log message 2 in the pattern storage unit 15.

The display unit 16 is provided inside or outside the log analysis device 10, and is formed by, for example, a screen display device such as an LCD (Liquid Crystal Display). The display unit 16 displays the pattern, the log message 2 and so on stored in the pattern storage unit 15. To the display unit 16, in addition to the generated patterns and the set of original logs corresponding to the respective patterns, statistical information such as the appearance frequency of each pattern and a variable included therein (for example, the calculation result by the field analysis unit 13) or the like are output. To the display unit 16, a tree diagram or the like showing the process of dividing the pattern may be output. The tree diagram is, for example, a tree diagram in which an upper node has a pattern with a high level of abstraction and a lower node has a more specific pattern in which a variable is replaced with a value.

The above is an example of the configuration of the log analysis device 10.

Further, in this example embodiment, the case where the log analysis device 10 has the log classification unit 11 that generates a pattern, and the log and pattern comparing unit 12 and the field analysis unit 13 that perform predetermined analysis has been described. Meanwhile, the log analysis device 10 may be configured to receive a pattern from another external device or the like. Moreover, the log analysis device 10 may not have a configuration for identifying the distribution of variables or values in a pattern as far as the distribution of variables or values in a pattern can be identified by any method.

Subsequently, an example of an operation of the log analysis device 10 will be described with reference to FIG. 6.

Referring to FIG. 6, the log classification unit 11 generates a pattern by performing value-to-variable conversion and aggregation on, of the logs contained in the log message 2, a plurality of logs having the same sequences of variables when the values of the respective fields in the logs are converted into variables (step S101). Moreover, the log classification unit 11 stores the generated pattern into the pattern storage unit 15.

The log and pattern comparing unit 12 compares the pattern generated by the log classification unit 11 with the longs of the generation source of the pattern for each field (step S102). Then, the log and pattern comparing unit 12 counts values corresponding to the variable for each field.

In a case where there is an unanalyzed pattern (step S103, YES), the field analysis unit 13 performs analysis of each field in the pattern (step S104). To be specific, in a case where there is a field having not been analyzed in the pattern to be analyzed (step S105, YES), the field analysis unit 13 executes a predetermined distribution calculation on the field (step S106). Then, in a case where the result of the calculation satisfies a condition such as a threshold value determined in advance (step S107, YES), the field analysis unit 13 determines to replace the variable of the field with a value (step S108). On the other hand, in a case where the result of the calculation does not satisfy the condition such as the threshold value determined in advance (step S107, NO), the field analysis unit 13 determines not to replace the variable of the field with a value.

After determining whether or not to perform replacement on the field, the field analysis unit 13 checks whether or not there is still a field having not been analyzed in the pattern to be analyzed (step S105). In a case where there is a field having not been analyzed (step S105, YES), the field analysis unit 13 executes the process of step S106 as described above. On the other hand, in a case where there is no unanalyzed field (step S105, NO), the field analysis unit 13 checks whether or not there is an unanalyzed pattern (step S103). In a case where an unanalyzed pattern is present (step S103, YES), the field analysis unit 13 executes the process of step S104 as described above. On the other hand, in a case where an unanalyzed pattern is not present (step S103, NO), the pattern update unit 14 replaces the variable of the field determined to replace by the field analysis unit 13 with a value. With this, the pattern update unit 14 generates a plurality of patterns based on a single pattern. Moreover, the pattern update unit 14 updates the pattern stored in the pattern storage unit 15 (step S109). After that, the display unit 16 can display the pattern, the log message 2 and so on stored in the pattern storage unit 15.

The above is an example of the operation of the log analysis device 10.

As described above, the log analysis device 10 includes the log and pattern comparing unit 12, the field analysis unit 13, the pattern update unit 14, and the pattern storage unit 15. With such a configuration, the log and pattern comparing unit 12 can count values contained in a variable by comparing a pattern generated by the log classification unit 11 with the logs of the generation source of the pattern for each field. Moreover, the field analysis unit 13 can determine whether or not to replace the variable of the field with a value by executing a predetermined calculation based on the result of counting by the log and pattern comparing unit 12. Moreover, the pattern update unit 14 can generate a new pattern by replacing a variable with a value based on the result of determination by the field analysis unit 13. Moreover, in the pattern storage unit 15, a pattern after replacement by the pattern update unit 14 can be stored. Herein, in general, in a case where the level of abstraction of a pattern is high (in a case where the ratio of variables is high), it is difficult to analyze logs with accuracy. On the other hand, in a case where the level of abstraction of a pattern is low (the ratio of values is high), it is difficult to efficiently analyze logs because many patterns are generated. According to this example embodiment, it is possible to replace a variable with a value based on the result of distribution calculation. With this, it is possible to replace information with low degree of randomness that should be noticed, and so on, with a value. As a result, it is possible to realize efficient analysis.

Further, according to this example embodiment, it is determined whether or not to perform replacement based on the result of the distribution calculation. Therefore, it is possible to determine whether or not to perform value-to-variable conversion and also perform replacement on a character string that can be optionally defined by the user, or the like. Consequently, even when a character string that can be optionally defined by the user, or the like, is included in a log, it is possible to determine whether to perform value-to-variable conversion and perform replacement with a value on the character string. As a result, it becomes possible to perform more efficient analysis.

The log analysis device 10 described in this example embodiment can perform efficient log analysis when performing analysis based on various logs, such as forecast of the operation rate and failure of a device by analysis of a characteristic log of equipment, detection of productivity and problem by analysis of the operation log of the worker, and log analysis for the purpose of detection of unauthorized access. It is needless to say that the log analysis device 10 may be configured to perform an analysis other than those illustrated above.

Second Example Embodiment

Figure 7:
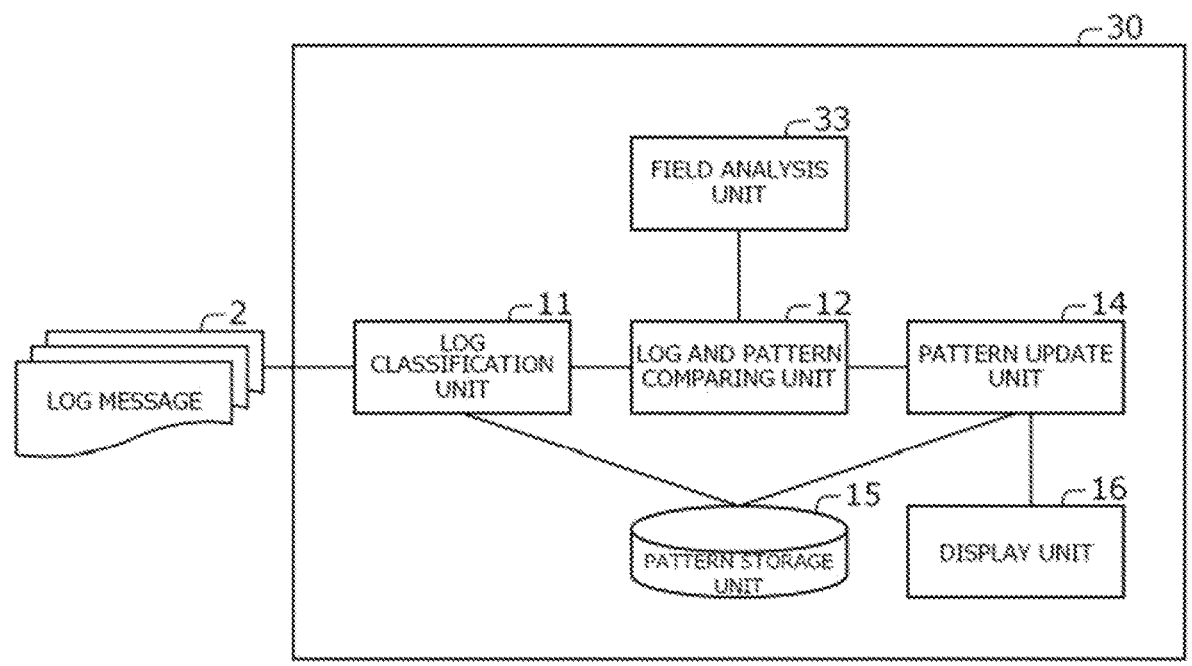
FIG. 7 is a block diagram showing an example of a configuration of a log analysis device in a second example embodiment of the present invention.

Next, a second example embodiment of the present invention will be described with reference to FIG. 7. FIG. 7 shows an example of a configuration of a log analysis device 30.

In the second example embodiment of the present invention, the log analysis device 30, which is a modified example of the log analysis device 10 described in the first example embodiment will be described. As will be described later, the log analysis device 30 is configured to be able to determine a degree of priority serving as a criterion for determining which one of a plurality of fields included in a pattern the replacement is first performed on. A degree of priority is information indicating a field in which a variable is preferentially replaced with a log value. For example, the log analysis device 30 performs the replacement in order from a field with a higher degree of priority. The log analysis device 30 may be configured to perform pattern analysis and replacement in order from a field with a higher degree of priority until a predetermined condition is satisfied, for example, the number of replacements satisfies a predetermined number, the number of generated logs satisfies a predetermined number, or the degree of priority is equal to or more than a predetermined value.

FIG. 7 shows an example of a configuration of the log analysis device 30. Referring to FIG. 7, the log analysis device 30 includes, for example, the log classification unit 11, the log and pattern comparing unit 12, a field analysis unit 33, the pattern update unit 14, the pattern storage unit 15, and the display unit 16.

The log analysis device 30 includes, for example, an arithmetic logic unit such as a CPU and a storage unit. For example, the log analysis device 30 realizes the abovementioned processing units by the arithmetic logic unit executing a program stored in the storage unit.

In FIG. 7, the same components as in the log analysis device 10 described in the first example embodiment are denoted by the same reference numerals as in FIG. 1. A characteristic configuration to this example embodiment will be described below.

As with the field analysis unit 13, the field analysis unit 33 determines whether or not to replace the variable of a field with a value based on a given distribution calculation on the basis of the result of counting by the log and pattern comparing unit 12 and based on a given condition. Moreover, the field analysis unit 33 performs determination of the degree of priority in addition to the given distribution calculation. Then, the field analysis unit 33 determines to perform the replacement from a field with a higher degree of priority. As a result, the pattern update unit 14 performs the replacement in order from a field with a higher degree of priority by the field analysis 15 unit 33.

For example, the field analysis unit 33 can be configured to determine a field where the number of replacements, which is the sum of the number of values and the number of variables after replacement, is smaller as a field with a higher degree of priority. Meanwhile, in a case where a variable is not left, the number of replacements is the number of values after replacement.

To be specific, for example, it is assumed that there are a field in which one variable is replaced with three values and a field in which one variable is replaced with five values and the variable is left as a result of analysis. In this case, the number of replacements of the field in which one variable is replaced with three values is 3, and the number of replacements of the field in which one variable is replaced with five values and the variable is left is 6. Then, the field analysis unit 33 determines that the field in which one variable is replaced with three values has a higher degree of priority than the field in which one variable is replaced with five values and the variable is left. Thus, the field analysis unit 33 can be configured to determine the degree of priority based on the number of replacements.

Further, for example, the field analysis unit 33 can be configured to determine a field satisfying more conditions of the methods described in the first example embodiment as a field having a higher degree of priority.

To be specific, for example, it is assumed that the field analysis unit 33 is configured to perform determination by using five methods including the number of types of values, the degree of randomness, the chi-squared value, the coefficient of variation, and the average value. In this case, the field analysis unit 33 determines a field in which all the five methods satisfy the conditions as a field having a higher degree of priority than a field in which four of the methods satisfy the conditions and a field in which three of the methods satisfy the conditions. Thus, the field analysis unit 33 can be configured to determine the degree of priority based on the number of satisfied conditions.

Meanwhile, the field analysis unit 33 may be configured to determine the degree of priority based on either the number of replacements or the number of satisfied conditions, or may be configured to determine the degree of priority by combining the both. In the case of determining the degree of priority by combining the both, for example, the field analysis unit 33 can be configured to determine a smaller number of replacements as a higher degree of priority and, if the number of replacements is the same, determine based on the number of satisfied conditions. The field analysis unit 33 may be configured to determine the degree of priority based on a method other than those illustrated above.

Further, the field analysis unit 33 can be configured to determine whether or not to perform the replacement in order from a field with a higher degree of priority until a given condition is satisfied, for example, the number of patterns after generated becomes a predetermined number or the number of values of fields to be replaced becomes a predetermined number. Moreover, the field analysis unit 33 may be configured to determine to actually replace only a field with a degree of priority of a predetermined value or more (for example, the number of replacements is equal to or less than 4), for example. The abovementioned predetermined conditions may be other than those illustrated above.

Thus, according to this example embodiment, the log analysis device 30 has the field analysis unit 33 that performs determination in consideration of the degree of priority. Such a configuration allows efficient replacement.

Third Example Embodiment

Figure 8:
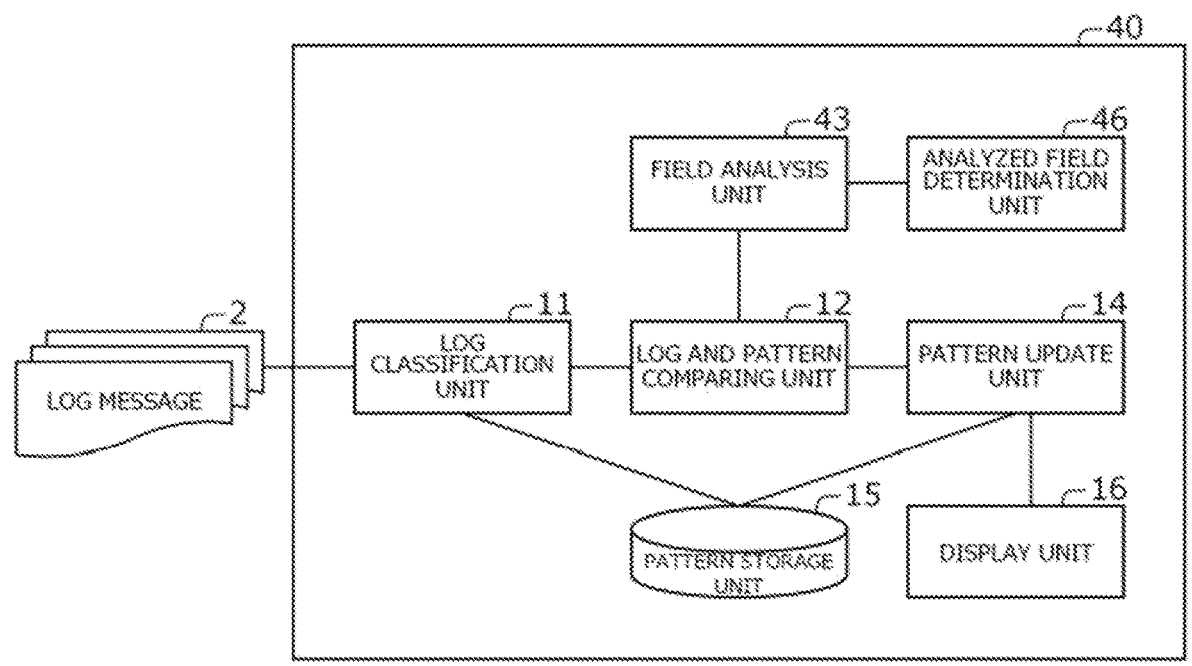
FIG. 8 is a block diagram showing an example of a configuration of a log analysis device in a third example embodiment of the present invention.

Next, a third example embodiment of the present invention will be described with reference to FIG. 8. FIG. 8 shows an example of a configuration of a log analysis device 40.

In the third example embodiment of the present invention, the log analysis device 40, which is a modified example of the log analysis device 10 described in the first example embodiment and the log analysis device 30 described in the second example embodiment, will be described. As will be described later, the log analysis device 40 is configured to be able to designate a field on which analysis and replacement is performed from among a plurality of fields included in a pattern. With such a configuration, the log analysis device 40 performs analysis and replacement on only part of the fields included in the pattern.

FIG. 8 shows an example of a configuration of the log analysis device 40. Referring to FIG. 8, the log analysis device 40 includes, for example, the log classification unit 11, the log and pattern comparing unit 12, a field analysis unit 43, an analyzed field determination unit 46 (determination unit) 46, the pattern update unit 14, the pattern storage unit 15, and the display unit 16.

The log analysis device 40 includes, for example, an arithmetic logic unit such as a CPU and a storage unit. For example, the log analysis device 40 realizes the abovementioned processing units by the arithmetic logic unit executing a program stored in the storage unit.

In FIG. 8, the same components as in the log analysis device 10 described in the first example embodiment and the log analysis device 30 described in the second example embodiment are denoted by the same reference numerals as in FIGS. 1 and 7. Below, a characteristic component to this example embodiment will be described.

As with the field analysis unit 13, the field analysis unit 43 determines whether or not to replace the variable of a field with a value based on a predetermined distribution calculation on the basis of counting by the log and pattern comparing unit 12 and based on a given condition. The field analysis unit 43 in this example embodiment determines whether or not to perform the replacement on a field determined to be an object of analysis and replacement by the analyzed field determination unit 46.

As with the field analysis unit 33 described in the second example embodiment, the field analysis unit 43 may be configured to also consider the degree of priority.

The analyzed field determination unit 46 determines which field in a log the analysis by the field analysis unit 43 is performed on. For example, the analyzed field determination unit 46 determines whether or not to perform the analysis in accordance with the designation by an operator who operates the log analysis device 40 or the distribution status of values such as the distribution of values in all the logs.

To be specific, for example, target information that is information indicating which field in a log is to be analyzed or which field is not to be analyzed is inputted in advance by an operator operating the log analysis device 40 and stored in a storage unit or the like. The analyzed field determination unit 46 can determine which field in a log is to be analyzed by the field analysis unit 43 based on the above information. For example, the analyzed field determination unit 46 can be configured not to analyze a field of date and time or the like based on the information stored in advance.

Further, for example, the analyzed field determination unit 46 can determine which field in a log is to be analyzed based on a value distribution status such as the distribution of variables in all the logs in the log message 2 or the distribution of variables in a pattern generated by the log classification unit 11 (the result of counting by the log and pattern comparing unit 12). For example, the analyzed field determination unit 46 can be configured to determine a field determined to have a unique value in a variable as a target for analysis based on the distribution of variables in all the logs in the log message 2. On the other hand, for example, the analyzed field determination unit 46 can be configured not to determine a field determined to have a higher degree of randomness as a target for analysis.

The analyzed field determination unit 46 may be configured to use only one of the methods described above, or may be configured to determine a field targeted for analysis and replacement by combining both the methods. In the case of combining both the methods, the analyzed field determination unit 46 may be configured to determine not to analyze all the fields determined not to analyze based on the respective criteria, or may be configured to determine not to analyze a field determined not to analyze based on both the criteria.

Thus, according to this example embodiment, the log analysis device 30 includes the analyzed field determination unit 46 and the field analysis unit 43. With such a configuration, the analyzed field determination unit 46 can determine which field is to be analyzed by the field analysis unit 43. Moreover, the field analysis unit 43 can analyze only a field determined to analyze by the analysis field determination unit 46 (or other than a field determined not to analyze by the analyzed field determination unit 46). Consequently, it becomes possible to perform analysis more sufficiently.

<Hardware Configuration>

Figure 9:
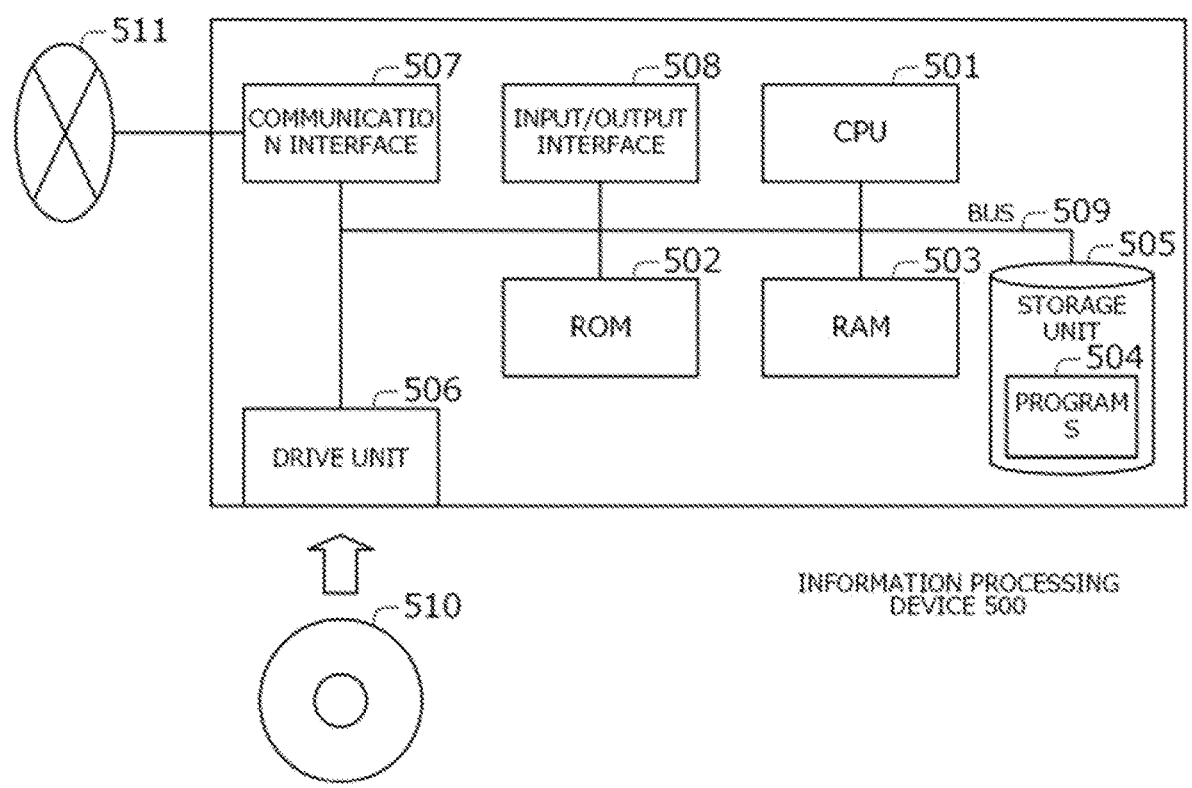
FIG. 9 is a view illustratively describing a hardware configuration of a computer (information processing device) capable of realizing the first exemplary embodiment, the second exemplary embodiment and the third example embodiment of the present invention.

In the first, second and third example embodiments described above, each of the components included by the log analysis device 10, the log analysis device 30 and the log analysis device 40 represents a block of function unit. All or part of the components included by the log analysis device 10, the log analysis device 30 and the log analysis device 40 can be realized by any combination of an information processing device 500 and a program as shown in FIG. 9, for example. FIG. 9 is a block diagram showing an example of a hardware configuration of the information processing device 500 that realizes the respective components of the log analysis device 10, the log analysis device 30 and the log analysis device 40. As an example, the information processing device 500 can include components as shown below:

CPU (Central Processing Unit) 501,
ROM (Read Only Memory) 502,
RAM (Random Access Memory) 503,
programs 504 loaded to the RAM 503,
storage unit 505 for storing the programs 504,
drive unit 506 that reads from and writes in a recording medium 510 outside the information processing device 500,
communication interface 507 connected to a communication network 511 outside the information processing device 500,
input/output interface 508 performing input/output of data, and
bus 509 connecting the respective components.

The respective components included by the log analysis device 10, the log analysis device 30 and the log analysis device 40 in the exemplary embodiments described above can be realized by the CPU 501 acquiring and executing the programs 504 realizing these functions. For example, the programs 504 realizing the functions of the components included by the log analysis device 10, the log analysis device 30 and the log analysis device 40 are stored in the storage unit 505 or the ROM 502 in advance, and the CPU 501 loads to the RAM 503 and executes as necessary. The programs 504 may be provided to the CPU 501 via the communication network 511. Alternatively, the programs 504 may be stored in the recording medium 510 in advance, and may be read and provided to the CPU 501 by the drive unit 506.

FIG. 9 shows an example of a configuration of the information processing device 500, and the configuration of the information processing device 500 is not exemplified in the abovementioned case. For example, the information processing device 500 may include part of the abovementioned configuration; for example, the drive unit 506 is not included.

Fourth Example Embodiment

Next, a fourth example embodiment of the present invention will be described with reference to FIG. 10. In the fourth example embodiment, the overview of a configuration of a log analysis device 60 will be described.

Figure 10:
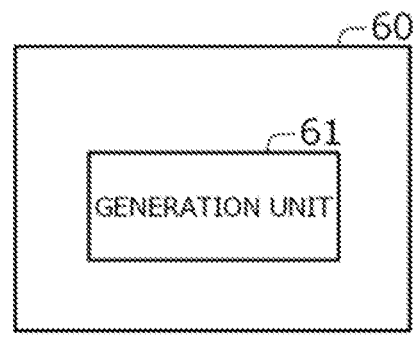
FIG. 10 is a block diagram showing an example of a configuration of a log analysis device in a fourth example embodiment of the present invention.

FIG. 10 shows an example of the configuration of the log analysis device 60. Referring to FIG. 10, the log analysis device 60 includes a generation unit 61, for example.

The log analysis device 60 includes, for example, an arithmetic logic unit such as a CPU and a storage unit. For example, the log analysis device 60 realizes the abovementioned processing units by the arithmetic log unit executing a program stored in the storage unit.

The generation unit 61 generates, based on the distribution of log values corresponding to a variable in an abstraction log in which at least one variable is included and the variable includes at least one or more log values, a new abstraction log in which the variable in the abstraction log is replaced with a value.

Thus, the log analysis device 60 has the generation unit 61. With such a configuration, the generation unit 61 can generate a new abstraction log in which a variable in an abstraction log is replaced with a value, based on the distribution of log values corresponding to the variable. In general, in a case where the level of abstraction of an abstraction log is high (a case where the ratio of variables is high), it is difficult to analyze logs with accuracy. On the other hand, in a case where the level of abstraction of an abstraction log is low (a case where the ratio of values is high), it is difficult to efficiently analyze logs because many patterns are generated. According to this example embodiment, it is possible to generate a new abstraction log in which a variable is replaced with a value, based on the distribution of log values corresponding to the variable. Consequently, for example, it is possible to generate an abstraction log in which notable information with a low degree of randomness is replaced with a value. As a result, it is possible to realize efficient analysis.

Further, according to this example embodiment, it is determined whether or not to generate a new abstraction log in which a variable is replaced with a value based on the distribution of log values corresponding to the variable. Therefore, it is possible to perform value-to-variable conversion on a character string which can be optionally defined by the user, or the like, and also determine whether or not to replace the variable with a value. Consequently, even if a log includes a character string which can be optionally defined by the user, or the like, it is possible to determine whether or not to abstract (determine whether or not to convert into a variable and whether or not to replace with a value). As a result, it is possible to perform more efficient analysis.

Further, the log analysis device 60 described above can be realized by a predetermined program installed in the log analysis device 60. To be specific, a program as an aspect of the present invention is a program for causing an information processing device to realize the generation unit 61 that generates a new abstraction log in which a variable in an abstraction value is replaced with a log value based on the distribution of log values corresponding to a variable in the abstraction log in which at least one variable is included and the variable includes at least one or more log values.

Further, a log analysis method executed by the log analysis device 60 described above is a method by which an information processing device generates a new abstraction log in which a variable in an abstraction value is replaced with a log value based on the distribution of log values corresponding to a variable in the abstraction log in which at least one variable is included and the variable includes at least one or more log values.

The inventions of the program and the log analysis method having the abovementioned configurations have the same actions and effects as the log analysis device 60, and therefore, can achieve the abovementioned object of the present invention.

<Supplementary Notes>

The whole or part of the exemplary embodiments disclosed above can be described as the following supplementary notes. Below, the overview of a log analysis device and so on according to the present invention will be described. However, the present invention is not limited to the following configurations.

(Supplementary Note 1)

A log analysis device comprising a generation unit configured to generate a new abstraction log based on a distribution of log values corresponding to a variable in an abstraction log, the abstraction log including at least one or more variables, the variable including at least one or more log values, the new abstraction log being obtained by replacing the variable in the abstraction log with the log value.

(Supplementary Note 2)

The log analysis device according to Supplementary Note 1, further comprising an analysis unit configured to calculate the distribution of the log values corresponding to the variable in the abstraction log based on a log including a plurality of values and the abstraction log generated by performing value-to-variable conversion, the value-to-variable conversion being converting the log value into the variable for each of predetermined fields obtained by separating the log at any position, wherein the generation unit is configured to generate the new abstraction log in which the variable in the abstraction log is replaced with the log value based on a result of the calculation by the analysis unit.

(Supplementary Note 3)

The log analysis device according to Supplementary Note 2, wherein the analysis unit is configured to count the log values corresponding to the variable for each of the fields and perform a predetermined distribution calculation for each of the fields based on a result of the counting.

(Supplementary Note 4)

The log analysis device according to Supplementary Note 2 or 3, wherein the analysis unit is configured to perform a distribution calculation of at least any one of a number of types of the values corresponding to the variable, a degree of randomness of the field, a chi-squared value, a coefficient of variation, and an average value, and compares a result of the distribution calculation with a threshold value determined in advance.

(Supplementary Note 5)

The log analysis device according to any one of Supplementary Notes 2 to 4, wherein:
  the analysis unit is configured to, based on the result of the calculation, determine to replace the variable of the field with the log value that is part of the log values corresponding to the variable and also leave the variable including the log values other than the replaced log value among the log values included in the variable before the replacement; and
  the generation unit is configured to, based on a result of the determination by the analysis unit, generate a new abstraction log in which the variable in the abstraction log is replaced with the log value determined to be replaced and also leave the abstraction log including the variable including the log values other than the replaced log value among the log values included in the variable before the replacement.

(Supplementary Note 6)

The log analysis device according to any one of Supplementary Notes 2 to 5, wherein the analysis unit is configured to determine a degree of priority indicating a field to preferentially replace the variable with the log value.

(Supplementary Note 7)

The log analysis device according to Supplementary Note 6, wherein the analysis unit is configured to determine the degree of priority based on a number of values after the replacement or a number of replacements of each of the fields, the number of replacements being a sum of the number of the values and a number of the variables after the replacement.

(Supplementary Note 8)

The log analysis device according to Supplementary Note 7, wherein the analysis unit is configured to determine that the degree of priority is higher as the number of replacements is lower.

(Supplementary Note 9)

The log analysis device according to any of Supplementary Notes 6 to 8, wherein the analysis unit is configured to perform a plurality of types of distribution calculations and determine the degree of priority based on a number of distribution calculations in which results of comparing results of the distribution calculations with thresholds values determined in advance satisfy predetermined conditions.

(Supplementary Note 10)

The log analysis device according to Supplementary Note 9, wherein the analysis unit is configured to determine that the degree of priority is higher as the number of the distribution calculations satisfying the conditions is more.

(Supplementary Note 11)

The log analysis device according to any one of Supplementary Notes 2 to 10, further comprising a determination unit configured to determine the field to be analyzed by the analysis unit,
  wherein the analysis unit is configured to perform calculation on the field determined to be analyzed by the determination unit.

(Supplementary Note 12)

The log analysis device according to Supplementary Note 11, wherein the determination unit is configured to determine the field to be analyzed based on target information showing the field to be analyzed.

(Supplementary Note 13)

The log analysis device according to Supplementary Note 11 or 12, wherein the determination unit is configured to determine the field to be analyzed in accordance with a distribution status of the values.

(Supplementary Note 14)

The log analysis device according to any one of Supplementary Notes 1 to 13, wherein the abstraction log is generated by performing value-to-variable conversion on a log including a plurality of values, the value-to-variable conversion being converting the log value into the variable for each of fields obtained by separating the log at any position.

(Supplementary Note 15)

A log analysis method executed by an information processing device, the log analysis method comprising generating a new abstraction log based on a distribution of log values corresponding to a variable in an abstraction log, the abstraction log including at least one or more variables, the variable including at least one or more log values, the new abstraction log being obtained by replacing the variable in the abstraction log with the log value.

(Supplementary Note 15-1)

The log analysis method according to Supplementary Note 15, further comprising:
  calculating the distribution of the log values corresponding to the variable in the abstraction log based on a log including a plurality of values and the abstraction log generated by performing value-to-variable conversion, the value-to-variable conversion being converting the log value into the variable for each of predetermined fields obtained by separating the log at any position; and
  generating the new abstraction log in which the variable in the abstraction log is replaced with the log value based on a result of the calculation.

(Supplementary Note 15-2)

The log analysis method according to Supplementary Note 15-1, further comprising counting the log values corresponding to the variable for each of the fields and performing a predetermined distribution calculation for each of the fields based on a result of the counting.

(Supplementary Note 16)

A computer program comprising instructions for causing an information processing device to realize a log analysis device comprising a generation unit configured to generate a new abstraction log based on a distribution of log values corresponding to a variable in an abstraction log, the abstraction log including at least one or more variables, the variable including at least one or more log values, the new abstraction log being obtained by replacing the variable in the abstraction log with the log value.

(Supplementary Note 16-1)

The computer program according to Supplementary Note 16, further comprising instructions for causing the information processing device to realize an analysis unit configured to calculate the distribution of the log values corresponding to the variable in the abstraction log based on a log including a plurality of values and the abstraction log generated by performing value-to-variable conversion, the value-to-variable conversion being converting the log value into the variable for each of predetermined fields obtained by separating the log at any position, wherein the generation unit is configured to generate the new abstraction log in which the variable in the abstraction log is replaced with the log value based on a result of the calculation by the analysis unit.

(Supplementary Note 16-2)

The computer program according to Supplementary Note 16-1, wherein the analysis unit is configured to count the log values corresponding to the variable for each of the fields and perform a predetermined distribution calculation for each of the fields based on a result of the counting.

The program described in the example embodiments and supplementary notes is stored in a storage device, or recorded on a computer-readable recording medium. For example, the recording medium is a portable medium such as a flexible disk, an optical disk, a magnetooptical disk, and a semiconductor memory.

Although the present invention has been described above with reference to the example embodiments, the present invention is not limited to the example embodiments. The configurations and details of the present invention can be changed in various manners that can be understood by one skilled in the art within the scope of the present invention.

DESCRIPTION OF NUMERALS 10 log analysis device
11 log classification unit
12 log and pattern comparing unit
13 field analysis unit
14 pattern update unit
15 pattern storage unit
16 display unit
2 log message
30 log analysis device
33 field analysis unit
40 log analysis device
43 field analysis unit
46 analyzed field determination unit
500 information processing device
501 CPU
502 ROM
503 RAM
504 programs
505 storage unit
506 drive unit
507 communication interface
508 input/output interface
509 bus
510 recording medium
511 communication network
60 log analysis device
61 generation unit

What is claimed is:

1. A log analysis device configured to perform log analysis for predicting operation rate of a device or a failure by analyzing a plurality of logs acquired from a predetermined device, the log analysis device comprising:
   one or more memories storing instructions; and
   one or more processors configured to execute the instructions to implement:
      a log classification unit configured to generate an abstraction log by performing conversion and aggregation into a corresponding variable, on at least one or more values in the plurality of logs, each of the plurality of logs comprising a plurality of fields, wherein each of the plurality of fields comprises a value corresponding to a variable of a plurality of variables;
      an analysis unit configured to calculate a distribution of the log values in the abstraction log, on a basis of the plurality of logs and the abstraction log generated by the log classification unit, identify a number of log values corresponding to each of the plurality of variables, and determine a degree of priority indicating a field to preferentially replace the variable with a log value, wherein the analysis unit is further configured to determine the degree of priority based on a number of values after the replacement or a number of replacements of each of the plurality of fields, the number of replacements being a sum of the number of the values and a number of the variables after the replacement; and
      a generation unit configured to generate a new abstraction log on a basis of a result of calculation by the analysis unit, the new abstraction log being obtained by replacing each of the plurality of variables in the abstraction log with the log value based on the number of log values corresponding the corresponding variable being less than or equal to a first threshold value,
   wherein at least one of the plurality of fields comprises a user defined character string.

2. The log analysis device according to claim 1, wherein the analysis unit is configured to perform a distribution calculation of at least any one of a number of types of the values corresponding to the corresponding variable, a degree of randomness of a field, a chi-squared value, a coefficient of variation, and an average value, and compares a result of the distribution calculation with a threshold value determined in advance.

3. The log analysis device according to claim 1, wherein:
   the generation unit is configured to leave each of the plurality of variables in the abstraction log based on the number of log values corresponding the corresponding variable being greater than the first threshold value.

4. The log analysis device according to claim 1, wherein the analysis unit is configured to determine that the degree of priority is higher as the number of replacements is lower.

5. The log analysis device according to claim 1, wherein the analysis unit is configured to perform a plurality of types of distribution calculations and determine the degree of priority based on a number of distribution calculations in which results of comparing results of the distribution calculations with thresholds values determined in advance satisfy predetermined conditions.

6. The log analysis device according to claim 5, wherein the analysis unit is configured to determine that the degree of priority is higher as the number of the distribution calculations satisfying the conditions is more.

7. The log analysis device according to claim 1, wherein the one or more processors are further configured to execute the instructions to implement a determination unit configured to determine a field to be analyzed by the analysis unit, and
wherein the analysis unit is configured to perform calculation on the field determined to be analyzed by the determination unit.

8. The log analysis device according to claim 7, wherein the determination unit is configured to determine the field to be analyzed based on target information showing the field to be analyzed.

9. The log analysis device according to claim 7, wherein the determination unit is configured to determine the field to be analyzed in accordance with a distribution status of the values.

10. A log analysis method executed by an information processing device which performs log analysis for predicting operation rate of a device or a failure by analyzing a plurality of logs acquired from a predetermined device, the log analysis method comprising:
generating an abstraction log by performing conversion and aggregation into a corresponding variable, on at least one or more values in the plurality of logs, each of the plurality of logs comprising a plurality of fields, wherein each of the plurality of fields comprises a value corresponding to a variable of a plurality of variables;
controlling an analysis unit to calculate a distribution of the log values in the abstraction log, on a basis of the plurality of logs and the abstraction log generated by the log classification unit, identifying a number of log values corresponding to each of the plurality of variables, and determining a degree of priority indicating a field to preferentially replace the variable with a log value, wherein the analysis unit determines the degree of priority based on a number of values after the replacement or a number of replacements of each of the plurality of fields, the number of replacements being a sum of the number of the values and a number of the variables after the replacement; and
generating a new abstraction log based on the calculating, the new abstraction log being obtained by replacing each of the plurality of variables in the abstraction log with the log value based on the number of log values corresponding the corresponding variable being less than or equal to a first threshold value,
wherein at least one of the plurality of fields comprises a user defined character string.

11. A non-transitory computer-readable recording medium having a computer program recorded thereon, the computer program comprising instructions for causing an information processing device, which performs log analysis for predicting operation rate of a device or a failure by analyzing a plurality of logs acquired from a predetermined device, to realize a log analysis device comprising:
a log classification unit configured to generate an abstraction log by performing conversion and aggregation into a corresponding variable, on at least one or more values in the plurality of logs, each of the plurality of logs comprising a plurality of fields, wherein each of the plurality of fields comprises a value corresponding to a variable of a plurality of variables;
an analysis unit configured to calculate a distribution of the log values in the abstraction log, on a basis of the plurality of logs and the abstraction log generated by the log classification unit, and identify a number of log values corresponding to each of the plurality of variables, and determine a degree of priority indicating a field to preferentially replace the variable with a log value, wherein the analysis unit is further configured to determine the degree of priority based on a number of values after the replacement or a number of replacements of each of the plurality of fields, the number of replacements being a sum of the number of the values and a number of the variables after the replacement; and
a generation unit configured to generate a new abstraction log on a basis of a result of calculation by the analysis unit, the new abstraction log being obtained by replacing each of the plurality of variables in the abstraction log with the log value based on the number of log values corresponding the corresponding variable being less than or equal to a first threshold value,
wherein at least one of the plurality of fields comprises a user defined character string.

* * * * *